US006546241B2

United States Patent
Iyengar et al.

(10) Patent No.: US 6,546,241 B2
(45) Date of Patent: *Apr. 8, 2003

(54) HANDSET ACCESS OF MESSAGE IN DIGITAL CORDLESS TELEPHONE

(75) Inventors: Vasu Iyengar, Allentown, PA (US); James Charles Popa, Allentown, PA (US); Richard M. Ubowski, Harleysville, PA (US)

(73) Assignee: Agere Systems Inc., Allentown, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/431,853

(22) Filed: Nov. 2, 1999

(65) Prior Publication Data

US 2002/0123326 A1 Sep. 5, 2002

(51) Int. Cl.[7] .................................................. H04Q 7/20
(52) U.S. Cl. ........................ 455/412; 455/413; 455/462
(58) Field of Search ................................. 455/413, 462, 455/412

(56) References Cited

U.S. PATENT DOCUMENTS

| | | | | |
|---|---|---|---|---|
| 4,677,655 A | * | 6/1987 | Hashimoto | 379/82 |
| 4,881,259 A | * | 11/1989 | Scordato | 379/58 |
| 5,163,082 A | * | 11/1992 | Karnowski | 379/88 |
| 5,327,481 A | * | 7/1994 | Horimoto | 455/412 |
| 5,327,520 A | * | 7/1994 | Chen | 395/2.28 |
| 5,568,538 A | * | 10/1996 | Tamir et al. | 379/447 |
| 5,572,575 A | * | 11/1996 | Yamamoto et al. | 379/388.01 |
| 5,583,915 A | * | 12/1996 | Ishida | 379/88.1 |
| 5,630,205 A | * | 5/1997 | Ekelund | 455/412 |
| 5,774,840 A | * | 6/1998 | Taumi et al. | 704/223 |
| 5,778,314 A | * | 7/1998 | Sudo et al. | 379/355.01 |
| 5,826,187 A | * | 10/1998 | Core et al. | 455/412 |
| 6,144,853 A | * | 11/2000 | Gentles et al. | 455/426 |
| 6,148,213 A | * | 11/2000 | Bertocci et al. | 455/462 |
| 6,233,320 B1 | * | 5/2001 | Haimi-Cohen | 379/88.16 |
| 6,256,354 B1 | * | 7/2001 | Yoshida et al. | 375/219 |

* cited by examiner

Primary Examiner—Thanh Cong Le
Assistant Examiner—Andrew T Harry
(74) Attorney, Agent, or Firm—William H. Bollman

(57) ABSTRACT

In one embodiment according to the invention, a digital cordless telephone includes a base unit adapted to couple to a telephone network, to transmit an outgoing message to an incoming caller, to store a digital message from the incoming caller, and to transmit and receive digital samples over an RF link. The digital cordless telephone of this embodiment also includes a handset adapted to transmit and receive digital samples over the RF link. According to this embodiment, the base unit and handset are further adapted to enable a user to monitor the stored digital message from the handset. In an alternative embodiment according to the invention, a method of accessing a digital message stored in one of a base unit and a handset of a cordless telephone from the other of the base unit and the handset includes the steps of transmitting a control signal from the accessing device to the storing device, retrieving the digital message, in encoded form, from a memory in the storing device, and transmitting at least a portion thereof to the accessing device. The method further includes the step of decoding the encoded digital message in the accessing device.

17 Claims, 2 Drawing Sheets

HANDSET ACCESS OF MESSAGE IN DIGITAL CORDLESS TELEPHONE

FIELD OF THE INVENTION

The invention is directed to the field of cordless telephony, and in particular to the field of digital cordless telephony.

BACKGROUND OF THE INVENTION

Cordless telephones comprise a base unit and a handset, wherein the base unit is typically coupled to a telephone network, such as the public switched telephone network, and the handset is free to roam within the vicinity of the base unit. The area within which the handset can roam is limited by the range of an RF link between the base unit and the handset.

The early versions of cordless telephones were known as "analog" cordless telephones, and typically operated in the 46–49 MHz range. The "analog" designation of these telephones derives from the analog nature of the RF link. The analog RF link is a product of transceivers in each of the base unit and the handset which would simply play an audio stream, as a radio broadcaster, for reception by the matching transceiver. This radio transmission could be picked up by any other receiver that was set to the transmitted frequency, such as by a scanner, or by a baby monitor.

Some high end versions of these analog telephones include an answering machine in the base unit. The answering machine typically includes a digital memory within which encoded speech messages are stored. An advantageous feature of such a high end analog cordless telephone is the ability of a user to monitor answering machine messages from the handset. Upon the appropriate signals provided by the handset to the base unit in response to user activation of a handset keypad, the base unit decodes stored speech messages, converts the decoded speech messages to analog signals via a digital-to-analog converter, and the analog speech is transmitted via the RF link. The user can thus listen to the stored messages from the handset.

More recent versions of cordless telephones are known as "digital" cordless telephones because the RF link is a digital link. When a user is engaged in a telephone call, the user's voice is converted in the handset to Adaptive Differential Pulse Code Modulated (ADPCM) digital samples, which are transmitted to the base unit in real time, while incoming voice signals from a distant party to a conversation are received by the base unit from a telephone network and converted to ADPCM digital samples, which are transmitted from the base unit to the handset. An advantage of a digital cordless telephone is that it is more secure, since the digital RF transmission is not as easily monitored. Also, the digital RF link tends to be more consistent and to have a greater range than an analog cordless telephone.

However, a drawback of a digital cordless telephone is that it is not necessarily compatible with the feature of monitoring stored messages from the handset, because the quality of the message is seriously degraded if the decoded message is ADPCM encoded by the base unit and then ADPCM decoded in the handset. There is a need, therefore, for a digital cordless telephone that supports the monitoring of stored messages from the handset, while maintaining a high voice quality.

SUMMARY OF THE INVENTION

This need is met, in one embodiment according to the invention, by a digital cordless telephone including a base unit adapted to couple to a telephone network, to transmit an outgoing message to an incoming caller, to store a digital message from the incoming caller, and to transmit and receive digital samples over an RF link. The digital cordless telephone of this embodiment also includes a handset adapted to transmit and receive digital samples over the RF link. According to this embodiment, the base unit and handset are further adapted to enable a user to monitor the stored digital message from the handset.

In an alternative embodiment according to the invention, a method of accessing a digital message stored in one of a base unit and a handset of a cordless telephone from the other of the base unit and the handset includes the steps of transmitting a control signal from the accessing device to the storing device, retrieving the digital message, in encoded form, from a memory in the storing device, and transmitting at least a portion thereof to the accessing device. The method further includes the step of decoding the encoded digital message in the accessing device.

BRIEF DESCRIPTION OF THE DRAWING

Objects and advantages of the invention will be apparent to one of skill in the art upon review of the following detailed description in light of the drawing, wherein.

DETAILED DESCRIPTION

Figure 1:
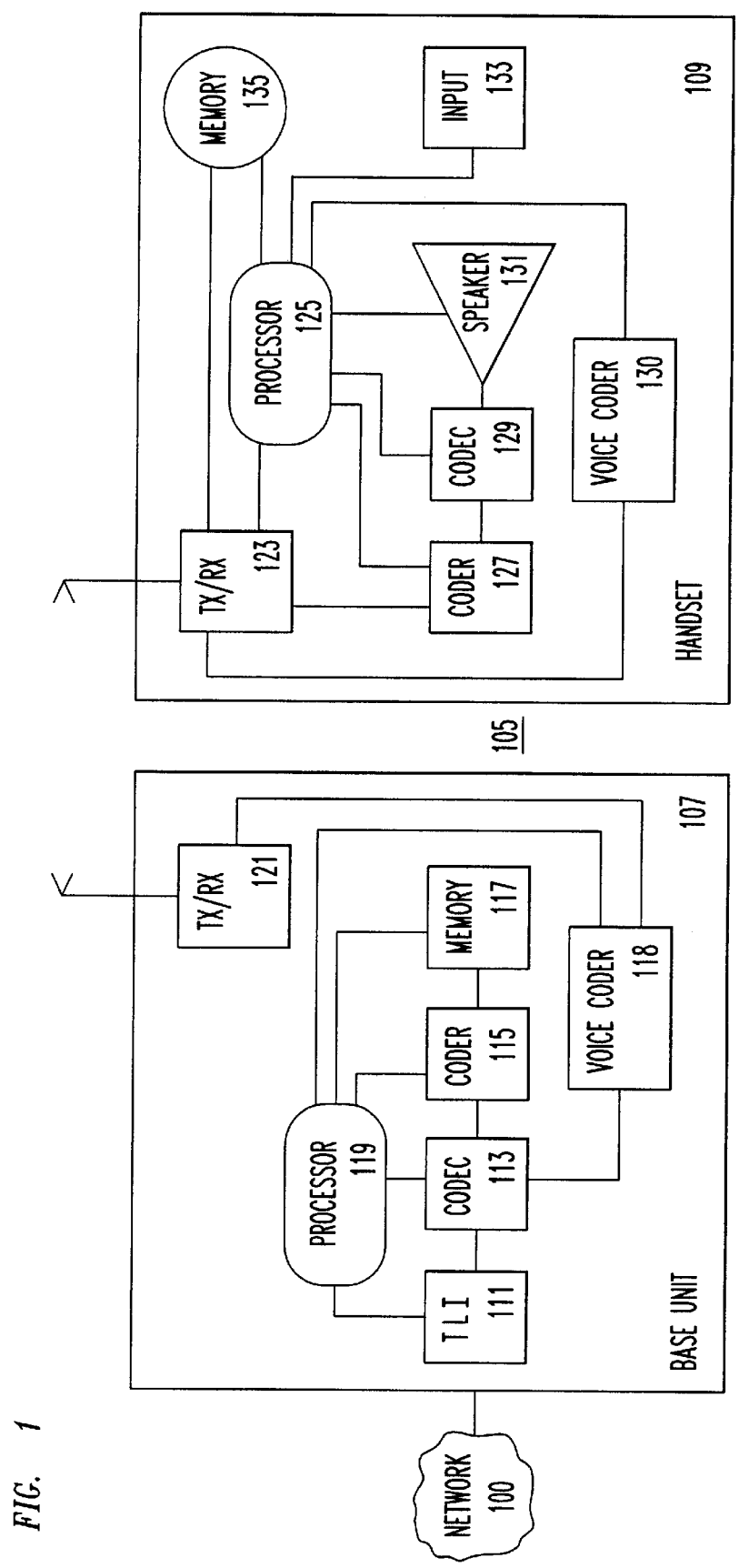
FIG. 1 is a simplified block diagram of an exemplary cordless telephone configured according to the invention.

FIG. 1 is a simplified block diagram of a digital cordless telephone 105 in one embodiment according to the invention. Cordless telephone 105 includes a base unit 107 and a handset 109. The base unit 107 includes an interface 111, such as a telephone line interface (TLI), that couples the base unit 107 to a network 100, such as a public switched telephone network. Base unit 107 also includes a codec 113, principally comprising an analog-to-digital converter and a digital-to-analog converter. The codec receives analog signals from the network via the TLI, and converts the analog signals to digital samples for use by the digital telephone 105, and receives digital samples from the telephone 105 and converts them to analog signals for transmission via the TLI onto the network.

Of course, if the network is a digital network, then a digital interface would be used and there would be no need for the codec 113 to convert the incoming digital data to a digital format. In such a case, the codec 113 may be eliminated completely, or may be replaced by a digital-to-digital converter that performs some form of reformatting to convert the incoming data for internal use.

Base unit 107 also includes a speech coder 115 that receives the digital samples from the codec 113 and encodes the samples according to an encoding scheme, such as the code excited linear predictive (CELP) encoding scheme. A primary purpose of coder 115 is to reduce a size of an incoming signal so that it will more easily fit within a predefined memory space. This is accomplished, according to the coding scheme of the coder 115, by reducing the number of digital bits necessary to characterize the signal. Some signal quality is invariably lost by this bit reduction process, such that the encoding scheme is a matter of design choice based on the desired application. There are many forms of CELP encoding, known, for example, as CELP+, RCELP, ACELP, LD-CELP, LMCELP and QCELP that are well known to one of skill in the art. Any of these encoding schemes may be employed by coder 115. Coder 115 also decodes encoded data for transmission to the codec 113, where it is therein converted or processed for transmission to the network 100 via the interface 111.

Base unit 107 also includes a memory 117, such as a random access memory (RAM). One function of memory 117 is to store incoming messages from incoming callers, for example, if a user of cordless telephone 105 does not respond to an incoming call within a predetermined number of rings. An incoming message, in one example, is thus received from the network 100 as an analog signal by TLI 111, converted to digital samples by codec 113, encoded by speech coder 115, and stored in memory 117.

Base unit 107 also includes a voice coder 118, such as an Adaptive Differential Pulse Code Modulated (ADPCM) voice coder, the primary purpose of which is to reduce a bandwidth, in real time, of a stream of digital samples so that they may be effectively transported in a full duplex manner between the base unit 107 and the handset 109 during a telephone conversation. The process of this real time coding via ADPCM, or another selected encoding scheme, is well known to one of skill in the art.

Base unit 107 also includes a processor 119, such as a microcontroller or digital signal processor (DSP), such as the DSP1609 available from Lucent Technologies, Inc. The coder 113, codec 115, memory 117 and voice coder 118 may be integrated into the same chip as processor 119, and may be, in whole or in part, functional blocks realized within processor 119. Processor 119 is depicted in the exemplary embodiment as coupled to each of the illustrated functional blocks of base unit 107, although alternative configurations are possible.

Base unit 107 also includes a transceiver 121 that establishes an RF link with a complementary transceiver 123 of handset 109. The RF link enables handset 109 to roam, limited only by the range of the link, within the vicinity of the base unit 107. Handset 109 also includes a processor 125, a coder 127, a codec 129 and a voice coder 130. These elements operate in a manner similar to the complementary elements of handset 107, and will be described functionally with respect to an operational example below. Handset 109 also includes transducers, including a speaker 131, as well as an input unit 133, such as a keypad. Optionally, for at least one exemplary embodiment, handset 109 may also include a memory 135.

When engaged in a conventional telephone call, telephone 105 acts as a conventional digital cordless telephone. For example, incoming analog signals from a distant party are digitized by codec 113 and converted to ADPCM by voice coder 118 for transmission to handset 109 over the RF link between the base unit 107 and the handset 109. The reason the voice coder 118, employing ADPCM, is employed for this purpose, as opposed to the coder 115 employing CELP, is that ADPCM is a low delay coder that operates sample by sample, whereas the CELP encoding scheme is a high delay, frame based scheme.

Figure 2:
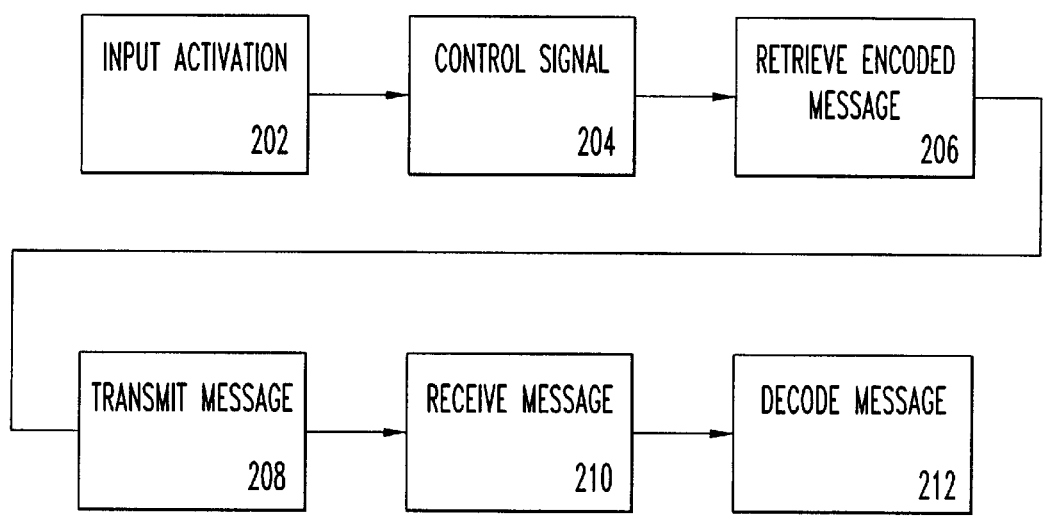
FIG. 2 is a simplified operational flowchart for a cordless telephone according to the invention.

Thus, a user of handset 109 may roam within the vicinity of base unit 107 and engage in telephone conversations wherein the RF link transports ADPCM encoded samples between the transceivers 121 and 123. Telephone 105 also enables, according to the invention, a user of handset 109 to monitor messages stored in memory 117 of base unit 107. In one exemplary operational example, which will be described with respect to the exemplary flowchart of FIG. 2, it is presumed that an incoming message from an incoming caller has been previously stored in the memory 117 of base unit 107. At step 202, the user activates the input unit 133, such as by pressing one or more buttons on a keypad. Processor 125 senses the activation and causes a corresponding control signal to be transmitted to the base unit 107 via the RF link established by the transceivers 121 and 123 at step 204.

Processor 119 of base unit 107 responds to the control signal by retrieving the incoming message from memory 117 in step 206. Whereas a conventional digital cordless telephone employs voice coder 118 to ADPCM encode everything transported over the RF link, in this exemplary embodiment, the CELP encoded message is retrieved from memory 117 and transported directly over the RF link (step 208). Thus, according to this embodiment, the message is not ADPCM encoded as part of the process of transmitting the message over the link.

The CELP encoded message is received at step 210 by the transceiver 123 of handset 109, and decoded by coder 127 at step 212 to produce digital samples for subsequent conversion to analog signals in codec 129 and output as audible signals from speaker 131. It should also be understood that the encoded message, the decoded message and/or the digital samples may be stored in optional memory 135, either as part of a user-directed message retrieval process, or as part of an automatic process performed off-line to facilitate subsequent user retrieval.

For example, the transfer of CELP encoded messages may occur, not in response to a user input via user input unit 133, but as part of a process to automatically transfer messages during an appropriate time, such as when telephone 105 is in an on-hook condition (i.e., not in use making a telephone call). These messages can thus be stored in memory 135 of handset 109, and can then be accessed at a subsequent point in time by a user via the input unit 133. When accessed, the CELP encoded message, stored in memory 135, will be retrieved from memory 135 by processor 125, forwarded to coder 127 to decode, forwarded to codec 129 to convert to analog form, and then played from speaker 131. Alternatively, the message may be decoded prior to storage in memory 135. In this case, upon a user request, the digital samples will be retrieved from memory 135 by processor 125, converted to analog in codec 129, and played from speaker 131.

One advantage of the inventive process is that it enables handset access of base-stored messages for a digital cordless telephone. In particular, by transmitting the CELP encoded data directly to the handset 109 for subsequent processing, the data is not further ADPCM encoded and decoded. Thus, the final quality of the output audible signals is acceptable to a user.

The aforementioned embodiment thus describes the advantageous transmission of CELP encoded data in place of ADPCM encoded data, with the premise that the RF link is devoted to transmitting data encoded according to one scheme or the other. It is also possible to employ the inventive concept to be shared, such that both ADPCM encoded data and CELP encoded data are transmitted. For example, a lower quality speech may be acceptable by, for example, dropping the ADPCM rate from 32 kbps to 24 kbps or even 16 kbps, thereby freeing up space for CELP encoded data.

By configuring the telephone in this way, an advantageous result is that it provides the ability to play a message during a telephone conversation. This allows one or both parties to the telephone conversation to review the stored message during the conversation. Another advantage is that a message could be retrieved via the handset at the same time that a similar message is retrieved by another user by calling into the base unit from a distant end telephone via the network 100.

The concept of the invention may also be employed in a "reverse" direction, wherein a message is encoded and stored in the memory 135 of the handset 109 and transmitted in the encoded form to the base unit 107 for retrieval. For example, a user may record a message to the handset 109 while the user is roaming, and the message may be retrieved by the user's spouse at a subsequent point in time from the base unit 107.

Based on an understanding of these various embodiments, one of skill in the art is likely to conceive of alternative embodiments that are not specifically enumerated here, but that are clearly within the scope of the invention. For example, although the transmit path between the base unit 107 and the handset 109 is described as being over an RF link between the transceivers 121 and 123, alternative transmit paths may be employed, such as via charge contacts typically used to charge a battery within the handset 109. Also, the inventive concepts may be employed to support an MP3 architecture in a cordless telephone, wherein the MP3 files are obtained by the base unit 107, for example, from the network 100, or from a computer coupled to a home network, and then uploaded according to the invention to the handset 109.

What is claimed is:

1. A digital cordless telephone, comprising:
   a base unit adapted to couple to a telephone network, to transmit an outgoing message to an incoming caller, to store a digital message from the incoming caller, and to transmit and receive digital samples over an RE link; and
   a handset adapted to transmit and receive digital samples over the RF link, said handset including a speech decoder adapted to decode speech coded data received over said RE link,
   wherein the base unit and the handset are further adapted to enable a user to monitor the stored digital message from the handset.

2. A digital cordless telephone as recited in claim 1, wherein the digital message from the incoming caller is received as an analog signal, and wherein the base unit includes an analog-to-digital converter adapted to convert the analog signal to a digital signal, and a speech coder adapted to encode the digital signal for storage in a memory.

3. A digital cordless telephone as recited in claim 2, wherein the speech coder is a code excited linear predictive coder.

4. A digital cordless telephone as recited in claim 2, wherein the base unit includes a processor, and wherein the processor is adapted to respond to a control signal received from the RF link by retrieving speech coded data from the memory and transmitting the speech coded data over the RF link.

5. A digital cordless telephone, comprising:
   a base unit adapted to couple to a telephone network, to transmit an outgoing message to an incoming caller, to store a digital message from the incoming caller, and to transmit and receive digital samples over an RF link; and
   a handset adapted to transmit and receive digital samples over the RF link,
   wherein the base unit and the handset are further adapted to enable a user to monitor the stored digital message from the handset,
   wherein the digital message from the incoming caller is received as an analog signal, and wherein the base unit includes an analog-to-digital converter adapted to convert the analog signal to a digital signal, and a speech coder adapted to encode the digital signal for storage in a memory,
   wherein the base unit includes a processor, and wherein the processor is adapted to respond to a control signal received from the RF link by retrieving speech coded data from the memory and transmitting the speech coded data over the RE link, and
   wherein the handset includes a speech coder and a digital-to-analog converter, and wherein the speech coder is adapted to decode the speech coded data and the digital-to-analog converter is adapted to convert the decoded data to an analog signal for playing from a speaker element.

6. A method of accessing a digital message stored in one of a base unit and a handset of a cordless telephone from the other of the base unit and the handset, comprising:
   transmitting a control signal from the accessing device to the storing device;
   retrieving the digital message, in encoded form, from a memory in the storing device, and transmitting at least a portion thereof to the accessing device; and
   decoding the encoded digital message in the accessing device.

7. A method as recited in claim 6, wherein the accessing device is the handset and the storing device is the base unit.

8. A method as recited in claim 6, wherein the accessing device is the base unit and the storing device is the handset.

9. A method as recited in claim 6, wherein the control signal is transmitted in response to activation of a keypad of the accessing device.

10. A method as recited in claim 6, wherein the digital message is stored in code excited linear predictive (CELP) form, and wherein the accessing device includes a CELP coder to perform the decoding step.

11. A method as recited in claim 6, further comprising the steps, in the storing device, of receiving an analog signal, converting the analog signal to a digital signal, and encoding the digital signal for storage.

12. A method as recited in claim 11, wherein the encoding step comprises code excited linear predictive encoding.

13. A cordless telephone, comprising:
   a base unit, including:
     an interface to a telephone network,
     an analog-to-digital converter coupled to the interface,
     a first speech coder having a first coding type coupled to the analog-to-digital converter,
     a second speech coder having a second coding type coupled to the analog-to-digital converter,
     an answering machine memory coupled to the first speech coder, and
     a transceiver adapted to selectively transceive one of the first coding type data and the second coding type data; and
   a handset, including:
     a transceiver adapted to selectively transceive data encoded by the first speech coder and the second speech coder coded in the base unit,
     a speech coder adapted to receive a speech coded digital signal from the answering machine memory of the base unit via an RE link, and to decode the speech coded digital signal,
     a digital-to-analog converter adapted to convert the decoded digital signal from the speech coder in the handset to an analog signal, and a speaker adapted to receive the analog signal and produce an audible signal.

14. The cordless telephone according to claim 13, wherein the first speech coder within the base unit utilizes code excited linear predictive (CELP) coding.

15. The cordless telephone according to claim 13, wherein the second speech coder within the base unit utilizes Adaptive Differential Pulse Code Modulated (ADPCM) coding.

16. The cordless telephone according to claim 13, wherein the answering machine memory is random access memory (RAM).

17. The cordless telephone according to claim 13, wherein the accessing device is the handset and the storing device is the base unit.

* * * * *